Jan. 23, 1923.

W. D. SMITH.
ACCOUNT BOOK.
FILED APR. 22, 1921.

1,442,832

1—CASH

5—EXPENSE

| | | | | ONLY BUSINESS MISC. | PERSONAL | AUTO MOBILE | CHARITY |
|---|---|---|---|---|---|---|---|
| Soap | | | | 25 | | | |

12—BUSINESS EXPENSE SUMMARY

| 13 | MERCH | GOLD | HELP | RENT | GAS | LIGHT | TELE-PHONE | TAXES | INSUR-ANCE | MISC | | TOTAL |
|---|---|---|---|---|---|---|---|---|---|---|---|---|
| JANUARY | | | | | | | | | | | | |
| FEBRUARY | | | | | | | | | | | | |
| TOTALS | | | | | | | | | | | | |

26—GENERAL SUMMARY

| 27 | CASH | OFFICE EXPENSE | NET INCOME | PERSONAL EXPENSE | CAR | CHARITY | NET GAIN | EQUIPMENT | OTHER INVESTMENTS |
|---|---|---|---|---|---|---|---|---|---|
| JANUARY | | | | | | | | | |
| FEBRUARY | | | | | | | | | |
| TOTALS | | | | | | | | | |

37—INCOME TAX SUMMARY

| GROSS INCOME FROM BUSINESS | 8024 | 50 | | EXEMPTION | 1000 | 00 | BALANCE TAXABLE | 3641 | 27 |
|---|---|---|---|---|---|---|---|---|---|
| TAXABLE INCOME FROM OTHER SOURCES | 500 | 00 | | DEPRECIATION AND LOSS | 450 | 00 | TAX DUE (% ON BALANCE TAXABLE) | 145 | 57 |
| TOTAL | | | 8524 | 50 | CHARITY | 100 | 10 | 40 | |
| TOTAL EXPENSE OF BUSINESS | | | 3333 | 13 | 39 | | | | |
| NET INCOME | | | 5191 | 37 | TOTAL DEDUCTIONS | | | 1550 | 10 |

Inventor
W. D. Smith
By
Attorneys

Patented Jan. 23, 1923.

1,442,832

UNITED STATES PATENT OFFICE.

WALTER DALE SMITH, OF ROSEDALE, KANSAS.

ACCOUNT BOOK.

Application filed April 22, 1921. Serial No. 463,600.

*To all whom it may concern:*

Be it known that I, WALTER DALE SMITH, a citizen of the United States, residing at Rosedale, in the county of Wyandotte and State of Kansas, have invented certain new and useful Improvements in Account Books, of which the following is a specification.

This invention relates to a book by which a system of accounting may be put into effect and whereby the cash allotted to various classes of purposes may be separated, providing a practicable and workable budget. An illustrative embodiment of the invention is shown in the accompanying drawings, in which the single figure shows sections of the various columns supplied by the invention, as well as the pockets for keeping the cash separated.

To keep an account of cash received a portion of the table marked cash, as at 1, is ruled in a column 2 for dates, a column 3 for items and a column 4 for amounts of cash received.

A second portion of the table bears a heading expense, as at 5; and is divided into a column 6 for dates, a column 7 for items and columns for a classification of the items of expense, indicated as a column for business miscellaneous as 8, for personal expenses 9, for expenses of the automobile 10, and amounts distributed as charity at 11.

Other classifications of the expense might readily be made but the classification described is chosen as comprising headings under which all of the money which is expended may be included, and as containing the items which it is most usually desired to keep separated.

A division of the tables with the heading business expense summary, as shown at 12, is divided into a column for the months of the year, as at 13, and columns headed merchandise 14, gold 15, help 16, rent at 17, gas at 18, light at 19, telephone at 20, taxes 21, insurance 22, miscellaneous 23, a column 24 left blank for optional use, and a column of totals at 25, in which the total expense for business for each month may be entered. By providing a place for entry of each of the items as above recited, into which the expense of doing business may be divided, for each month of the year, the total of each element of expense for the year may be entered at the bottom of each column, as well as the total of all the items for each month in column 25 of totals.

A fourth division of the tables is provided with the heading general summary, as shown at 26, and it is also provided with a column marked 27 containing a line for each month of the year. The general summary is shown as provided with a column 28 for entry of the cash received in each month, a column 29 for office expenses, and 30 for net income. Also a column 31 for personal expense, 32 for automobile expense, marked car, 33 for total of the amounts expended for charity in each month; a column 34 to indicate the net gain and a column 35 for expense of equipment, and also at 36 a column for other investments.

The use of the above tables will make possible not only the easy and prompt ascertainment of a person's financial standing, but will also provide convenient source of information for filling out income tax blanks. For the latter purposes a section of the table is given the heading at 37 of income tax summary. The portion of the table devoted to income tax summary as indicated by the lettering thereon has a column 38 with space for entry of gross income for business, for taxable income from other sources, space for the total, for the total expense of business and for net income. Another section of the income tax summary section has spaces for entry of exemption, depreciation and loss, amount expended for charity and a space for the total of these items marked total deductions, as shown at 39. The result of the summary is entered in the portion marked balance taxable and the tax due is entered at 40.

To make the system of accounting a practical and workable budget system a series of pockets are provided, which pockets are marked as shown, pocket 41 cash received and four pockets are provided for the placing of cash which is set aside for different purposes, that at 42 for personal expenses, 43 automobile, 44 office miscellaneous and 45 for charity.

By entry of the cash received in the cash section of the table, by the setting aside of a portion of the cash received from pocket 41 into each of the other pockets, and entry of the amounts thus placed under the proper heading in the expense section 5 of the tables a very simple manner of keeping track of expenses and of determining the amount which shall be disbursed for each class of expenses is provided. The provision of the summaries makes possible a monthly or annual inspection of the different channels into which outgoing funds have been turned, so as to make it possible to detect undue expense in any line.

The general summary brings together all of the different elements, so as to make it possible for the user to detect his general financial standing at the end of each month and at the end of each year. From the information gathered from the first part of the tables the income tax summary can be readily filled out, thereby making the filling out of the income tax blank each year a very simple matter.

Minor changes may be made in the physical embodiment of the invention without departing from the spirit.

I claim:

1. An account book comprising in combination, a properly designated section for cash received, a properly designated section for expense comprising properly designated columns for entry of only daily business expenditures and for various indicated items of personal expense, and a properly designated section for business expense secondary having properly designated lines for monthly entry of items and for yearly totals of items and properly designated columns for entry of items for which monthly bills are received a properly designated column for entry of monthly totals of daily business expense as derived from the daily expense section and a properly designated column for monthly totals of business expense whereby items of business expense paid monthly need be entered but once and added twice to arrive at monthly and yearly totals of all business expense and yearly expense for each item.

2. An account book comprising a properly designated section for cash received, a daily expense section comprising properly designated columns for entry of only daily business expense and other properly designated columns for entry of classified daily personal expenditures, a section for business expense summary comprising properly designated columns for items paid monthly, for monthly totals of daily business expense as derived from the daily expense section, and for monthly totals of business expense, and properly designated lines for monthly entries and for yearly totals, a section for summary of general financial standing comprising properly designated lines for monthly entries and for yearly totals and properly designated columns for each cash received, office or business expenses as derived from monthly totals of business expense summary, for net income as derived by comparison of the two last named columns, for various items of personal expense as derived from the daily expense section, for net gain as derived from a comparison of the personal expenses with the net income and for investments.

In testimony whereof I affix my signature hereto.

WALTER DALE SMITH.